No. 731,304. PATENTED JUNE 16, 1903.
H. A. HOWE.
ROD PACKING.
APPLICATION FILED FEB. 25, 1903.
NO MODEL.
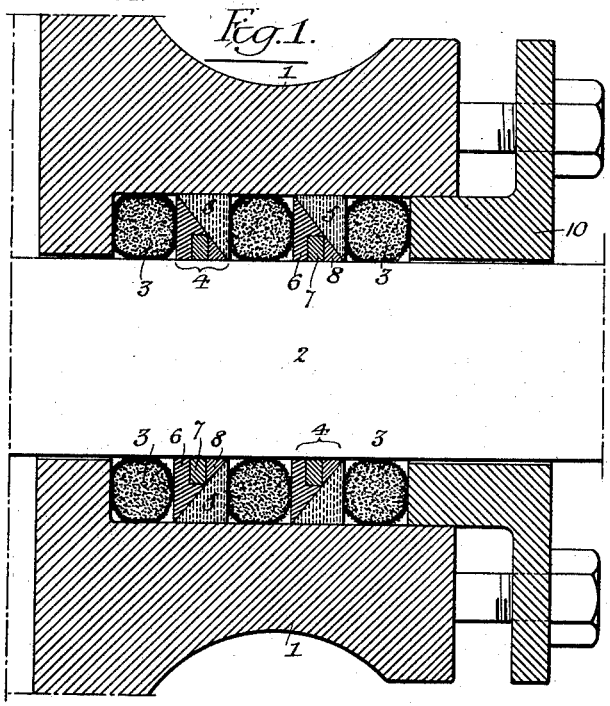
Fig. 1.
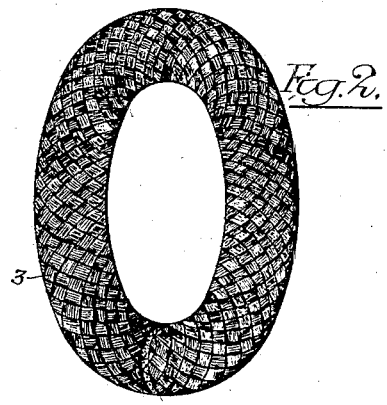
Fig. 2.
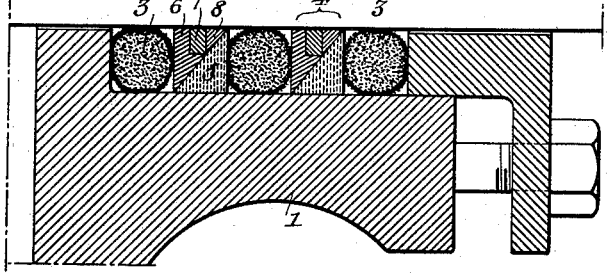
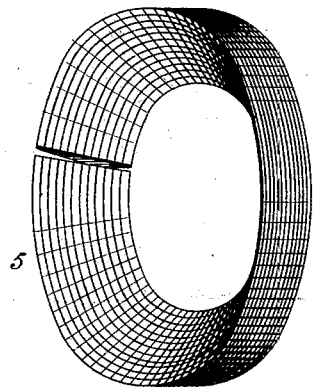
Fig. 3.
Fig. 4.
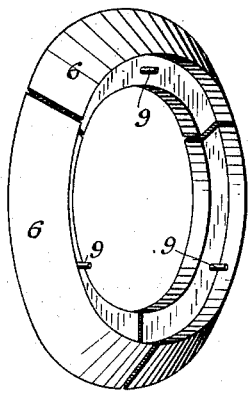 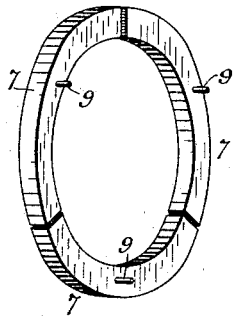 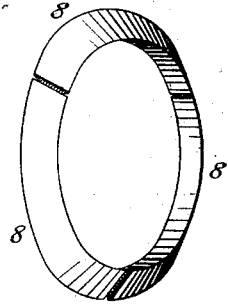
Witnesses:—
Augustus B. Coppes
Herman E. Metius
Inventor:—
Henry A. Howe,
by his Attorneys;

No. 731,304. Patented June 16, 1903.

UNITED STATES PATENT OFFICE.

HENRY A. HOWE, OF PROVIDENCE, RHODE ISLAND, ASSIGNOR TO CHARLES A. DANIEL, OF PHILADELPHIA, PENNSYLVANIA.

ROD-PACKING.

SPECIFICATION forming part of Letters Patent No. 731,304, dated June 16, 1903.

Application filed February 25, 1903. Serial No. 144,937. (No model.)

*To all whom it may concern:*

Be it known that I, HENRY A. HOWE, a citizen of the United States, and a resident of Providence, Rhode Island, have invented certain Improvements in Rod-Packing, of which the following is a specification.

My invention relates to that class of packing for piston-rods, valve-rods, pump-plungers, and the like which have contractible metallic rings bearing upon the rod and preventing leakage of steam or other fluid around the same, the object of my invention being to so construct a rod-packing of this character that the same will be self-setting—that is to say, it will respond to the pressure within the cylinder or valve-chest and will bear upon the rod with a varying force, depending upon the variations of the pressure.

A further object of the invention is to permit lateral movements of the packing in the stuffing-box, such as may be caused by irregularities in the surface of the rod or by movements of the latter due to wear of the piston, improper alinement of the cross-head, or other causes.

In the accompanying drawings, Figure 1 is a vertical sectional view of a stuffing-box provided with rod-packing in accordance with my invention; and Figs. 2, 3, and 4 are perspective views of the three different constructions of rings of which the packing is composed, the elements of the ring shown in Fig. 4 being separated from each other in order to more fully illustrate the construction of said elements.

1 represents part of the stuffing-box structure of a cylinder or valve-box, and 2 part of the piston or valve rod.

The invention is applicable to rods used in various forms of apparatus employing either steam, water, oil, air, gas, ammonia, or other fluid; but in order to simplify the description I will assume that the invention is applied to the piston-rod of a steam-engine.

The packing comprises three different forms of rings, (indicated, respectively, at 3, 4, and 5,) as many of these rings being employed as the character of the work to be performed may suggest.

The ring 3 may consist of ordinary fibrous or asbestos rope packing, so long as it possesses a certain amount of resiliency, the purpose of this ring being to act as a cushion for the other rings of the packing and by compression and expansion to permit to-and-fro movement of said rings in the box.

The ring 5 may consist of a fabric of cotton duck, asbestos, or other material; but this ring, while not rigid, should be of so compact a character as to afford a proper bearing for the remaining ring 4 of the set, which is composed of metal of any available character, depending upon the character of the work which is to be performed, a wide range being permissible, from iron or steel on the one hand to Babbitt metal or other soft metal or alloy on the other.

The ring 3 is of rounded quadrangular cross-section; but the rings 4 and 5 are of triangular section with their diagonal faces in contact with each other, the angle of these faces being varied as desired to give the required coefficient of friction of the packing on the rod, depending upon the particular use of the packing and the range of pressure to which it is likely to be subjected.

The ring 4 is composed of three sections 6, 7, and 8, each split into segments, so that it is free to expand and contract, these segments being disposed so as to break joint and prevent leakage between them and being retained in proper relation to each other by any suitable means, such as dowel-pins 9, on one segment fitting between adjoining segments. The ring as shown is composed of three sections; but it may be composed of but two sections, if desired—for instance, the sections 6 and 8—or may even be made in one piece in some cases.

The inclined face of the ring 6 is recessed for the reception of the ring 7, the latter being of quadrangular cross-section and filling the recess, so that it is confined laterally to the ring 6, the ring 8 being of triangular cross-section and being disposed with one of its flat faces against the ring 7 and its inclined face forming a continuation of that of the ring 6.

When there is pressure in the stuffing-box end of the cylinder, such pressure finds its way into the rear end of the stuffing-box and acts upon the rings therein, so as to force them forwardly, the cushioning-rings 3 yielding slightly to pressure and the wedge action of the rings 5 upon the rings 4 forcing the latter down upon the rod with a pressure commensurate with the pressure in the cylinder. Hence just the required amount of pressure of the rings 4 upon the rod to prevent leakage is effected without unnecessary friction and wear upon the rod.

At the point of cut-off or whenever from other cause the pressure in the stuffing-box end of the cylinder begins to diminish the pressure of the packing on the rod likewise diminishes, the rings 4 gradually sliding back on the inclined surfaces of the rings 5 and the rod, correspondingly with the reduction of pressure in the cylinder, until by the time the stuffing-box end of the cylinder is open to the exhaust the pressure of packing on the rod will be only enough to prevent leakage of air into the cylinder around the rod, it being understood that the gland 10 of the stuffing-box is not screwed up tightly in the first instance, but only sufficient to cause the rings 4 to press lightly upon the rod.

When the sections of the rings 4 become worn, it will be sufficient in many cases simply to renew the sections 7 and 8, thus saving expense.

The rings 5 are susceptible of a limited amount of compression laterally, so that the packing does not form a rigid bearing for the rod, but is free to play laterally to a limited extent in the box to accommodate inequalities in the rod or defects in the alinement of the same.

The use of the fibrous ring 3 as a cushion for the rings 4 and 5 instead of a metallic spring prevents any injury to the rod, such as is sometimes caused by metallic springs breaking and jamming against the rod, so as to cut or groove the same.

I am aware of the patent of Norman B. Miller, No. 524,178, dated August 7, 1894, in which a pair of wedge-shaped rings of fibrous material were combined with a cushioning-ring; but my invention is distinct from packing of that character in that in my packing the bearing upon the rod relied upon to prevent leakage is a metallic bearing.

Having thus described my invention, I claim and desire to secure by Letters Patent—

1. The combination in a rod-packing, of a compressible metallic ring bearing upon the rod and having a beveled outer face and a face transverse to the axis of the rod, a ring of fibrous material interposed between the wall of the stuffing-box and said bearing-ring and providing a beveled bearing for the beveled face of the latter, said fibrous ring also having a face transverse to the axis of the rod, and a fibrous cushion bearing against the transverse face of one of the rings and transmitting pressure thereto, substantially as specified.

2. The combination in a rod-packing, of a compressible metallic ring composed of a series of sections movable independently of each other, said ring having bearing upon the rod and having a beveled face and a face transverse to the axis of the rod, a fibrous ring interposed between the wall of the stuffing-box and said bearing-ring, and also having a face transverse to the axis of the rod, and a beveled face in contact with the beveled face of the bearing-ring, and a fibrous cushion bearing upon the transverse face of one of the rings and transmitting pressure thereto, substantially as specified.

3. A rod-packing consisting of a metallic ring composed of sections, the outermost of which have beveled faces, one of which is recessed for the reception of one of the other sections, said sections having a bearing upon the rod, a fibrous ring interposed between the wall of the stuffing-box and said bearing-ring, and presenting a beveled face for engagement with that of the bearing-ring, and a fibrous cushion for transmitting pressure to said rings, substantially as specified.

4. A rod-packing in which a pair of wedge-shaped rings having their beveled faces in contact with each other and presenting a metallic bearing to the rod, are combined with a fibrous cushion for transmitting pressure to said rings, substantially as specified.

5. A rod-packing in which a series of pairs of wedge-shaped rings having their beveled faces bearing upon each other, and presenting a metallic bearing to the rod, are combined with fibrous cushions confining and separating said pairs of wedge-shaped rings, and transmitting pressure thereto, substantially as specified.

6. A rod-packing in which a series of pairs of wedge-shaped rings each consisting of an inner compressible metallic ring bearing upon the rod and an outer ring of fibrous material bearing upon the wall of the box, said rings having their beveled faces in contact with each other, are combined with a series of fibrous cushions located one at each end of the series of pairs of wedge-shaped rings, and one between each pair and the next, said cushions transmitting pressure to the wedge-shaped rings, substantially as specified.

In testimony whereof I have signed my name to this specification in the presence of two subscribing witnesses.

HENRY A. HOWE.

Witnesses:
JOHN A. McGRATH,
C. BURTON KENDALL.